(12) United States Patent
Hillenbrand et al.

(10) Patent No.: US 11,693,241 B2
(45) Date of Patent: Jul. 4, 2023

(54) OPTICAL SYSTEM FOR TRANSMITTING A SOURCE IMAGE

(71) Applicant: tooz technologies GmbH, Aalen (DE)

(72) Inventors: Matthias Hillenbrand, Jena (DE); Hans-Juergen Dobschal, Kleinromstedt (DE); Artur Degen, Jena (DE); Holger Muenz, Aalen (DE)

(73) Assignee: tooz technologies GmbH, Aalen (DE)

( * ) Notice: Subject to any disclaimer, the term of this patent is extended or adjusted under 35 U.S.C. 154(b) by 396 days.

(21) Appl. No.: 16/955,033

(22) PCT Filed: Nov. 21, 2018

(86) PCT No.: PCT/EP2018/082041
§ 371 (c)(1),
(2) Date: Jun. 17, 2020

(87) PCT Pub. No.: WO2019/120839
PCT Pub. Date: Jun. 27, 2019

(65) Prior Publication Data
US 2020/0379254 A1 Dec. 3, 2020

(30) Foreign Application Priority Data
Dec. 18, 2017 (DE) .......................... 102017130344.8

(51) Int. Cl.
*G02B 27/01* (2006.01)
(52) U.S. Cl.
CPC ..... *G02B 27/0103* (2013.01); *G02B 27/0172* (2013.01); *G02B 2027/0174* (2013.01); *G02B 2027/0178* (2013.01)
(58) Field of Classification Search
CPC ............ G02B 27/0103; G02B 27/0172; G02B 2027/0174; G02B 2027/0178; G02B 27/4272; G02B 5/12; G02B 2027/0123
See application file for complete search history.

(56) References Cited

U.S. PATENT DOCUMENTS 10,180,574 B2 * 1/2019 Mukawa .............. G02B 6/0033
2006/0291021 A1 * 12/2006 Mukawa ............ G02B 27/0944
359/15

(Continued)

FOREIGN PATENT DOCUMENTS

AU 2017254798 A1 11/2017
DE 102014207492 A1 10/2015

(Continued)

OTHER PUBLICATIONS

Kilary et al., Advanced characterization of electrowetting reflectors, Sep. 2009, Optics Express. (Year: 2009).*

(Continued)

*Primary Examiner* — Dmitriy Bolotin
(74) *Attorney, Agent, or Firm* — Skaar Ulbrich Macari, P.A.

(57) ABSTRACT

An optical system for transmitting a source image includes a light guide, which defines a light transmission channel, an optical coupling arrangement and an optical decoupling arrangement, the coupling arrangement being designed to couple light emerging from the source image into the light guide arrangement in such a way that the light can propagate in the light guide arrangement by total reflection, and the decoupling arrangement being designed to decouple light that has propagated in the light guide arrangement from the light guide arrangement. The light guide arrangement comprises an optical deflection device, which, as viewed in the direction of propagation of the light in the light guide arrangement, is arranged between the coupling arrangement and the decoupling arrangement and is designed to deflect light ray bundles, emerging from the coupling arrangement at different beam angles and impinging divergently on the deflection device, in bundled manner towards the decoupling arrangement.

15 Claims, 8 Drawing Sheets

(56) References Cited

U.S. PATENT DOCUMENTS

| | | | |
|---|---|---|---|
| 2010/0039796 A1* | 2/2010 | Mukawa | G02B 6/0033 362/97.1 |
| 2010/0103078 A1* | 4/2010 | Mukawa | G02B 27/0176 345/8 |
| 2012/0287675 A1* | 11/2012 | Mukawa | G02B 5/32 362/618 |
| 2013/0135749 A1* | 5/2013 | Akutsu | G02B 6/0031 359/861 |
| 2013/0249945 A1* | 9/2013 | Kobayashi | G02B 17/006 345/633 |
| 2015/0109678 A1* | 4/2015 | Mukawa | G02B 5/18 359/630 |
| 2017/0059868 A1* | 3/2017 | Takeda | G02B 27/4211 |
| 2017/0235144 A1 | 8/2017 | Piskunov et al. | |
| 2018/0011321 A1* | 1/2018 | Akutsu | G02B 5/203 |
| 2018/0196267 A1* | 7/2018 | Takashima | G02B 27/28 |
| 2020/0225480 A1* | 7/2020 | Bodiya | G02B 27/0172 |
| 2020/0225483 A1* | 7/2020 | Yamaguchi | G02B 6/0048 |
| 2020/0271936 A1* | 8/2020 | Leibovici | G03H 1/0244 |
| 2020/0310130 A1* | 10/2020 | Noguchi | G02B 27/4272 |

FOREIGN PATENT DOCUMENTS

| | | |
|---|---|---|
| DE | 102015122055 A1 | 6/2017 |
| WO | 2016130509 A1 | 8/2016 |
| WO | 2017011333 A1 | 1/2017 |
| WO | 2017102795 A1 | 6/2017 |
| WO | 2017120320 A1 | 7/2017 |

OTHER PUBLICATIONS

The International Search Report and Written Opinion rendered by the International Searching Authority for PCT/EP2018/082041, dated Feb. 19, 2019, 16 pages.

International Search Report rendered by the International Searching Authority for PCT/EP2018/082041, dated Feb. 19, 2019, 2 pages.

International Preliminary Report on Patentability rendered by the International Bureau of WIPO for PCT/EP2018/082041, dated Jun. 23, 2020, 8 pages.

\* cited by examiner

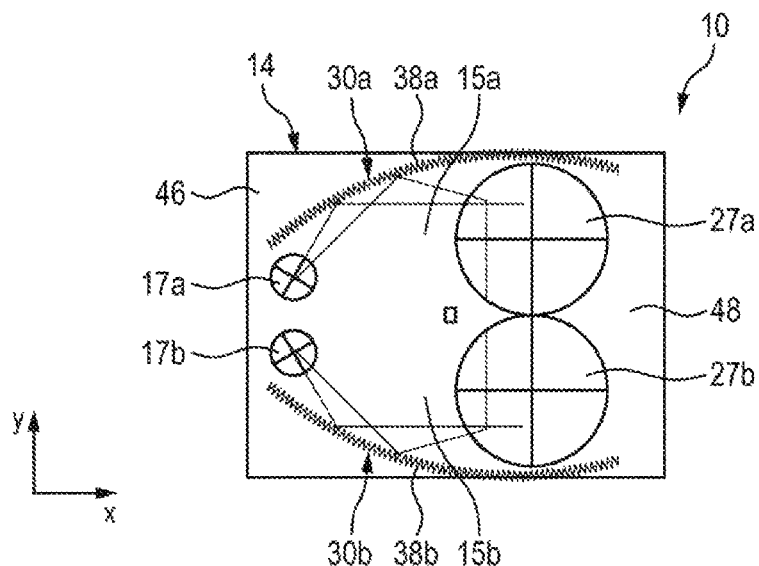
Fig. 10A
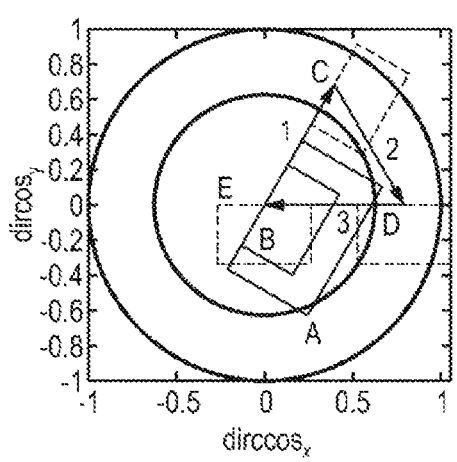 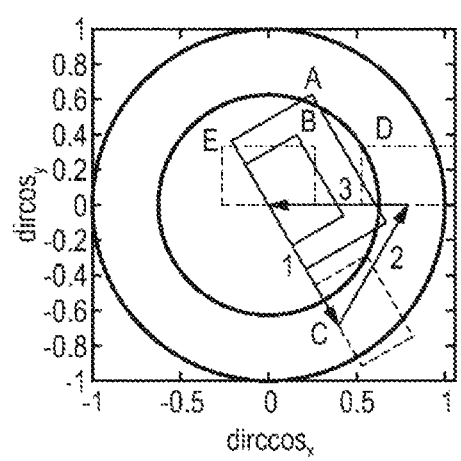
Fig. 10B        Fig. 10C

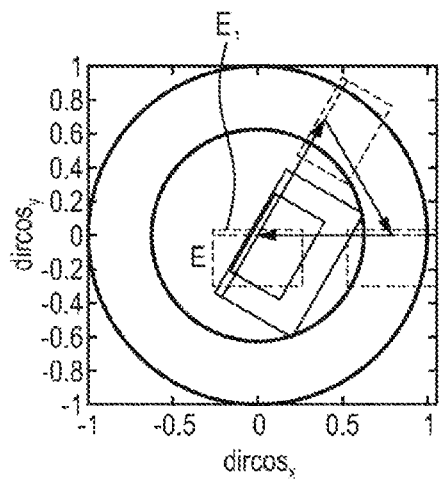 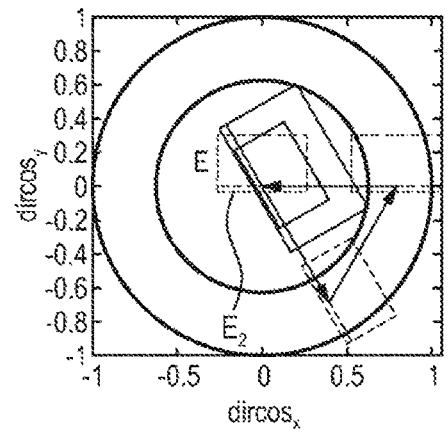
Fig. 11A  Fig. 11B
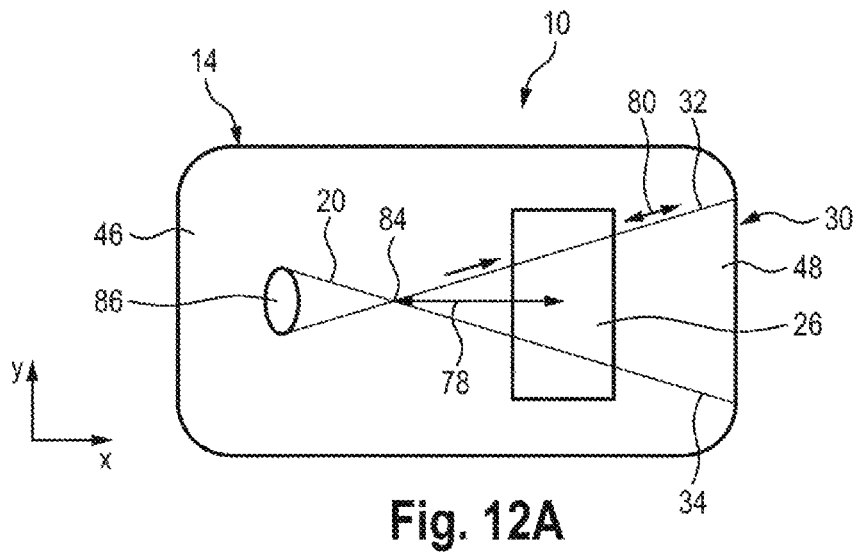
Fig. 12A
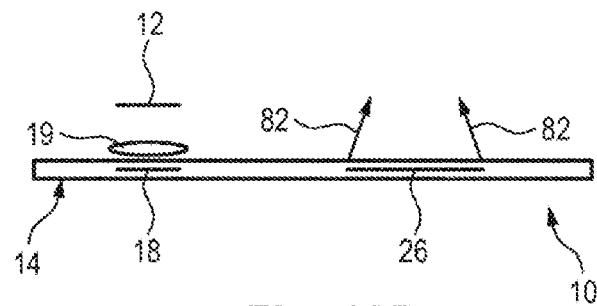
Fig. 12B

OPTICAL SYSTEM FOR TRANSMITTING A SOURCE IMAGE

PRIORITY

This application claims the priority of German patent application DE 10 2017 130 344.8, filed Dec. 18, 2017, which is hereby incorporated herein by reference in its entirety.

FIELD

The invention relates to an optical system for transmitting a source image, comprising a light guide arrangement which defines a light transmission channel, comprising an optical input coupling arrangement, and comprising an optical output coupling arrangement, the input coupling arrangement being embodied to couple light emanating from the source image into the light guide arrangement in such a way that the light coupled into the light guide arrangement can propagate in the light guide arrangement by way of total-internal reflection and the output coupling arrangement being embodied to couple the light that has propagated in the light guide arrangement out of said light guide arrangement.

BACKGROUND

An optical system of the type set forth at the outset is known from WO 2017/102795 A1.

Such an optical system is used in a display system, for example, such as an HUD (head-up display) or HMD (head-mounted display). An HUD and an HMD are display systems in which a source image is projected into the user's visual field. Here, the source image can be, for example, the image of a display, of a vehicle instrument, of a mobile phone, of a game console, of a computer, a camera image and the like. HUDs are used nowadays for example in aircraft and motor vehicles in order to project information, for example navigation information and the like, for the pilot or driver into the latter's field of view, without the pilot or driver having to divert his/her viewing direction from the straight-ahead viewing direction. An HMD, in contrast to an HUD, is worn on the user's head. An HMD either presents images on a screen close to the eyes, or projects said images directly onto the retina. Other designations for an HMD include video glasses or smartglasses, helmet display or virtual reality helmet.

The principal components of such display systems are a display unit which supplies the source image from a connected data source and an optical system for transmitting the source image in such a way that a viewer can perceive the image with the eye.

As described in the document set forth at the outset, the optical system of such display systems can have as constituent parts a usually planar light guide arrangement, which has one or more light guides in which light can propagate by total-internal reflection at optical interfaces, an optical input coupling arrangement, by means of which the light emanating from the source image can be coupled into the light guide arrangement, and an optical output coupling arrangement, which couples the image information of the source image guided in the light guide arrangement by means of total-internal reflection out of said light guide arrangement. In the case of head-mounted systems, the output coupling arrangement steers the image information to the eye of the viewer after being output coupled such that the light of the source image can enter one or both eyes of the user. Consequently, the output coupling arrangement is located close to the point of intersection between the main visual axis and the light guide arrangement in this case. Here, the output coupling arrangement can have the function of a beam splitter which overlays the information emanating from the real surroundings with the virtual image information from the smartglasses (a so-called augmented reality system).

In optical systems of the type set forth at the outset, the angular range, transportable by the light guide arrangement, of the light coupled into the light guide arrangement by means of the input coupling arrangement is limited; specifically, firstly, by the refractive index-dependent critical angle of total-internal reflection and, secondly, by propagation of light parallel to the interfaces of the light guide arrangement (grazing incidence). If the critical angle of total-internal reflection is exceeded, some of the light emerges from the light guide arrangement at a wrong location. Some of the light likewise does not reach the correct output coupling location in the case of propagation parallel to the interfaces. The usable angular bandwidth of the light transmission through the light guide arrangement is further restricted by further boundary conditions such as manufacturing and adjustment tolerances. There is always the desire to use the usable angular bandwidth efficiently for the transmission of the greatest amount of image information, i.e., a large field of view (FOV) or the largest possible virtual image.

Depending on the type of output coupling arrangement and depending on the refractive index of the light guide arrangement, the angular bandwidth of the light that has propagated in the light guide arrangement translates into a different angular bandwidth outside of the light guide arrangement. In principle, greater angular bandwidths at the eye (i.e., outside of the light guide arrangement) of the viewer can be realized with output coupling arrangements based on mirrors than with diffractive or holographic output coupling arrangements. Output coupling arrangements based on mirrors are furthermore advantageous in that the source image can be transmitted with a very large spectral bandwidth in a single light guide of the light guide arrangement. The reason for this is that the deflection angle of a mirror layer is independent of the wavelength. In contrast, the deflection angle of gratings and holograms is strongly dependent on the wavelength. If use is made of diffractive or holographic output coupling arrangements, the definition of a plurality of wavelength ranges (e.g., red, green, blue) and the provision of a separate output coupling structure per spectral range has therefore been proposed, as described in the document set forth at the outset. In the case of diffractive output coupling, the light guide arrangement can also have a separate light guide for different field angle ranges.

What is common to optical systems, of the type set forth at the outset, for transmitting source images is that the image information provided for the eye, i.e., the transmitted source image, must be provided at the correct position of the output coupling arrangement in order to reach the eye of the viewer. However, this leads to the following technical problem. If the light path is considered in the reverse direction, i.e., from the pupil of the eye to the output coupling arrangement and from the output coupling arrangement to the input coupling arrangement, the light pipe continuously increases, i.e., continuously expands. In this context, the light pipe describes the envelope of all rays that emanate from the entire source image and scan the entire pupil of the optical system. Since the light pipe at the input coupling region of the light guide arrangement consequently has a very large extent, this means that the input coupling region of the light guide arrangement must be very large. A complete illumination of a very large-area input coupling region of the light guide arrangement using an optical unit between the light guide arrangement and the display, however, is difficult and furthermore linked with extreme demands on the input coupling optical unit.

SUMMARY

Therefore, the invention is based on the object of developing an optical system of the type set forth at the outset in such a way that the input coupling region for coupling the light emanating from the source image into the light guide arrangement can be kept comparatively small and the hence the demands on the input coupling arrangement can also be kept small.

In respect of the optical system set forth at the outset, this object is achieved according to certain embodiments of the invention by virtue of the light guide arrangement having an optical deflection device which, as seen in the direction of propagation of the light in the light guide arrangement, is disposed between the input coupling arrangement and the output coupling arrangement and which is embodied to deflect light beams, which emanate from the input coupling arrangement at different field angles of the field angle spectrum and which are incident on the deflection device in a divergent fashion, to the output coupling arrangement in focused fashion.

In the optical system according to certain embodiments of the invention, the technical problem of a disadvantageously large input coupling region is solved by an optical deflection device which, as seen in the direction of propagation of light in the light guide arrangement, is disposed between the input coupling arrangement and the output coupling arrangement. If, as described above, the light path from the eye pupil of the observer is considered in the direction of the input coupling arrangement, the situation arises now where the light pipe has its greatest extent at the deflection device since the deflection device focuses light beams, divergently emanating from the input coupling arrangement with different beam or field angles, to the output coupling arrangement. From the deflection device, the extent of the light pipe reduces again in the direction of the input coupling arrangement. The same situation arises when tracking the light path in reverse. In the direction of propagation of light of the light in the light guide arrangement, the optical deflection device is disposed between the input coupling arrangement and the output coupling arrangement, this also comprising the case where the deflection device can be, but need not be, geometrically disposed between the input coupling arrangement and the output coupling arrangement; instead, it could also be disposed in a region that is not geometrically located between the input coupling arrangement and the output coupling arrangement, but beyond the same. In the optical system according to the invention, the input coupling region can be kept small and the demands on the input coupling arrangement are also relaxed.

Possible embodiments of the optical deflection device are described below.

In one embodiment, the deflection device is embodied to deflect the light beams, which are incident thereon, in such a way that an angle between the incident and deflected light beam is at least approximately the same for all light beams.

In this design, the deflection device brings about the reversal of the beam or field angle distribution of the individual light beams in the light guide arrangement. Here, the angle between an incident and deflected light beam can be an acute angle or an obtuse angle, or it can even be 0° (more precisely 180°) in the case of retroreflection at the optical deflection device.

In a further embodiment, the deflection device is embodied as a pupil relay optical unit, which images a source image-side entry pupil onto an eye-side exit pupil.

This embodiment is particularly advantageous within the sense of an input coupling region, for coupling the light emanating from the source image into the light guide arrangement, which is the smallest possible; in particular, this can keep the input coupling region particularly small, particularly if the light emanating from the source image is directed onto the input coupling region as a parallel beam.

The deflection device provided in the optical system according to the invention can have a reflective or diffractive optical structure or a combination of a reflective and diffractive structure.

A reflective optical structure can be advantageous due to less field cropping or cropping of the beam angle distribution in the light guide arrangement, as will still be described in more detail below. In particular, a diffractive structure can have one or more holographic-optical elements, in particular holographic mirrors, in particular volume holograms. The aforementioned structures represent special cases of diffractive structures. Volume holograms have a pronounced angular selectivity in respect of their optical properties such as reflection and transmission.

By way of example, a multiplexed (i.e., multiply exposed) volume hologram can be designed in such a way that it acts like a mirror for a defined angular or spectral range. It is also possible to generate holographic mirror surfaces that are perpendicular in the light guide arrangement, i.e., the normal of the mirror is perpendicular to the normal of the light guide arrangement. The holographic mirror surfaces are almost completely transparent to the angular and spectral ranges for which they are not designed. Consequently, such elements can also be positioned in the viewing region (region through which the case is directed) of the light guide arrangement without being perceived by the user. Volume holograms consequently allow deflection devices for optical systems for transmitting source images to be realized in a very flexible fashion. By way of example, the distance of the deflection device from the output coupling and input coupling elements can be flexibly varied.

Preferably, the deflection device is embedded in the light guide arrangement.

From a manufacturing point of view, this can be realized by virtue of the deflection device being able to be provided within the production process of the light guide arrangement when producing the light guide arrangement, for example when the latter is molded from plastic.

In a further embodiment, the deflection device is preferably disposed near an edge of the light guide arrangement.

Advantageous in this case is that the deflection device does not disturb the visual field of the eye of the viewer.

If the optical system is worn on the head of the viewer, for example if the optical system is used in smartglasses or video glasses, the deflection device is preferably disposed on the upper, lower, nasal and/or temporal edge of the light guide arrangement.

As already mentioned above, the deflection device can also be disposed in the viewing region of the light guide arrangement when the deflection device is designed with volume holograms since said light guide arrangement may be transparent on account of its pronounced angle selectivity for the light rays incident at angles for which the volume holograms do not have a reflective effect.

The deflection device can have mirrors in further embodiments. Advantageously, the mirrors can be plane mirrors or angled mirrors. Use could also be made of prisms that have mirrored surfaces or are operated with total-internal reflection. The mirrors could also be holographically generated mirrors, which have a pronounced angle selectivity in terms of their reflection properties.

Angled mirrors, which are constructed from two plane mirrors disposed in roof-shaped fashion, are advantageous in that an incident beam is always deflected through the same angle independently of the relative rotational position of the angled mirror about an axis of rotation perpendicular to the principle section. Here, the term angled mirror does not presume that the entire element denoted an angled mirror need have mirroring properties. It is also possible for portions of the area of the angled mirror to have a non-mirroring embodiment, for example in the region of the angled mirror tip.

Here, it is furthermore advantageous if the angled mirrors are disposed and/or oriented along a circular line segment such that points of intersection of light rays incident on the angled mirrors and reflected by the same angled mirrors are located on a circular line segment.

The inscribed angle theorem is used in this embodiment; this states that, for two fixed points and a third movable point, all of which lying on a circle, the internal angle at the movable third point of the triangle formed by the three points remains constant independently of the position of the point on the circle.

In this embodiment of the deflection device, the light beams divergently incident on the angled mirrors of the deflection device are all deflected by substantially the same angle, to be precise independently of the beam angle of the incident light beams, at which they are incident on the deflection device.

Further advantageously, apex sections of the angled mirrors can be cut off and/or unused regions of the angled mirrors can be embodied as non-reflective, for example by blackening or any other suitable measure. The apex sections or tips of the angled mirrors are not required for deflecting the light beams incident thereon. By removing the tips, it is possible to remove a large portion of the mirror surfaces of the angled mirrors, as a result of which the angled mirrors and hence the deflection device can have a relatively flat embodiment at one edge of the light guide arrangement. This achieves the further advantage that the deflection device does not appear in the visual field, even in the case of a relatively strong eye rotation.

As a result of a non-reflective embodiment of regions of the angled mirrors not used by the light beams, it is also possible to avoid single reflections, or more than two reflections, on the angled mirrors, which could lead to stray light.

Moreover, angle-selective coatings could be provided on the angled mirrors for the purposes of avoiding stray light or extraneous light as a result of more than two reflections at the angled mirrors.

Furthermore, it is advantageous if the angled mirrors have a minimum width of 0.5 mm on their open side. Preferably, the angled mirrors could have a minimum width ranging from 0.5 mm to 1 mm, further preferably ranging from 0.5 mm to 1.5 mm, on their open side.

If the angled mirrors have a size that is too small, there can be a loss of resolution of the optical system if a light beam is incident on different angled mirrors at the same time and diffracted at the latter.

A further measure for avoiding more than two reflections on the angled mirrors can consist of setting the orientations or relative rotational positions of the angled mirrors with respect to one another in such a way that they are adapted to the beam or field angles of the incident light beams. In particular, this can also avoid the case where a light beam is only reflected once at an angled mirror, which would not lead to the desired deflection of the light beam.

In the case of the design of the deflection device with angled mirrors, these operate optimally as a pupil relay optical unit if the points of intersection of the light rays incident on the angled mirrors and reflected by the same angled mirrors are located on a circular line segment. However, a slight offset is acceptable and leads to the light beams belonging to the different field angles not intersecting precisely at the pupil of the eye of the viewer.

In further embodiments, the angled mirrors can vary individually in terms of their size, can be twisted or can be displaced in terms of their relative position.

As already mentioned above, the deflection device can be embodied in such a way that it retroreflects the light beams incident thereon; i.e., the light beams incident thereon experience a deflection through 180°. A retroreflector has an optical structure which casts a light ray incident on the optical structure back on itself, independently of the angle of incidence. However, deviating from conventional 3-dimensional retroreflection, the present invention only requires retroreflection in two dimensions, to be precise in the two dimensions parallel to the interfaces of the light guide arrangement at which the light experiences total-internal reflection during the propagation through the light guide arrangement. Examples of such retroreflectors include the angled mirrors already mentioned above should these have two plane mirrors that form an angle of 90° with one another.

According to further embodiments, a segmented transmission of the source image to be transmitted could also be considered. Thus, the light transmission channel can be a first light transmission channel for transmitting a first partial field of the source image and the light guide arrangement can have a second light transmission channel for transmitting a second partial field of the source image, wherein the light guide arrangement has a first detection device and a second deflection device, the first deflection device being assigned to the first light transmission channel and the second deflection device being assigned to the second light transmission channel.

Advantageously, larger source images can be transmitted in a multi-channel light guide arrangement than in a single-channel light guide arrangement since there is less field cropping in the case of a multi-channel transmission of individual, correspondingly smaller partial fields of the source image. Consequently, within the scope of the aforementioned measure, the entire field of the source image is subdivided into smaller partial fields which are guided to the output coupling arrangement along different paths and which supplement one another to form the overall field after output coupling (so-called "field stitching"). By way of example, this can be realized by virtue of the upper and lower edge of the light guide arrangement having a respective deflection device in the case of a head-mounted optical system, said deflection devices each being designed with different deflection angles. Accordingly, the optical system then has at least two input coupling arrangements and at least two output coupling arrangements for the corresponding number of light transmission channels. By contrast, the light guide arrangement itself can have only a single planar light guide, even in the case of the multi-channel transmission; however, it could also have a plurality of light guides stacked on one another. It is understood that the present design may also comprise a segmented multi-channel transmission of the source image to be transmitted in more than two light transmission channels, with a corresponding division of the source image into more than two partial fields.

In further embodiments, the input coupling arrangement of the optical system can have at least one mirror or a diffractive structure. The input coupling arrangement can have a transmissive or reflective diffraction grating, which deflects the light beams incident thereon in such a way that these can propagate within the light guide arrangement by way of total-internal reflection. The input coupling arrangement can be embedded in the light guide arrangement (transmissive or reflective input coupling arrangement) or on the light entry surface (transmissive input coupling arrangement) or on the surface located opposite the light entry surface (reflective input coupling arrangement). In the case of the design with a mirror, the latter is suitably tilted with respect to the surface normal of the light guide arrangement and/or rotated about the normal. The input coupling arrangement could also have one or more prisms and/or volume holograms, the latter representing a special case of diffractive structures. The input coupling arrangement has the function of deflecting the light beams, which emanate from the source image, upon entry or immediately after entry into the light guide arrangement in such a way that the light beams are then able to propagate in the light guide arrangement by way of total-internal reflection at the interfaces of the light guide arrangement (usually an air/material of the light guide arrangement transition).

The optical system can have a display, which provides the source image, and an optical unit, preferably a collimation optical unit, which directs the light emanating from the source image onto the input coupling arrangement, as a parallel light beam in the case of a collimation optical unit.

In particular, coupling in the light emanating from the source image as a parallel beam is advantageous in conjunction with the design of the deflection device as a pupil relay optical unit. Here, the entry pupil of the system can be imaged onto the pupil of the eye of the viewer.

Advantageously, the optical system can be embodied as smartglasses or video glasses, as a head-mounted display (HMD) or as a head-up display (HUD).

Further advantages and features of the invention are evident from the following description and the attached drawing.

It goes without saying that the aforementioned features and those yet to be explained below can be used not only in the respectively specified combination but also in other combinations or on their own, without departing from the scope of the present invention.

BRIEF DESCRIPTION OF THE DRAWINGS

Exemplary embodiments of the invention are illustrated in the drawing and described in more detail below with reference thereto. In the figures:

FIG. 10A to 10C show a further exemplary embodiment of an optical system for transmitting a source image, FIG. 10A showing the geometric arrangement of parts of the system, FIG. 10B showing the diagram of transmission of a first partial field of the source image, and FIG. 10C showing the diagram of the transmission of a second partial field of the source image in direction cosine space;

FIGS. 11A and 11B show two diagrams in direction cosine space for the transmission of the two partial fields in a development of the exemplary embodiment in FIG. 10A to 10C;

FIGS. 12A and 12B show a further exemplary embodiment of an optical system for transmitting a source image with a deflection device based on retroreflection, FIG. 12A showing the system in a view from a viewer and FIG. 12B showing the system in a view from above when the optical system is worn on the head of the viewer.

Figure 1A:
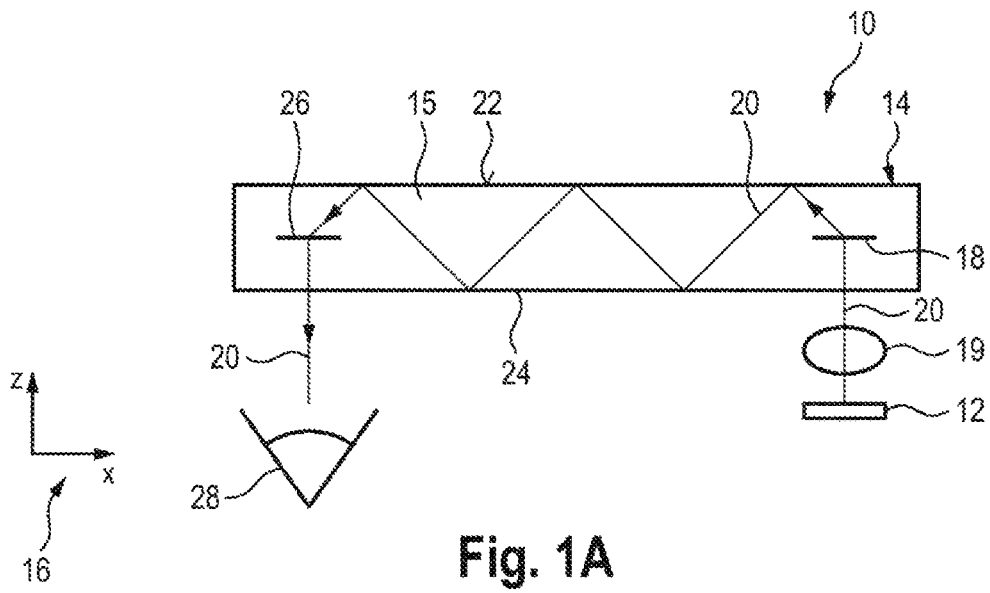
FIGS. 1A and 1B schematically show an optical system for transmitting a source image, FIG. 1A showing a view of the optical system from above and FIG. 1B showing a view as seen from the viewer when the optical system is worn on the head of the viewer.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 1B:
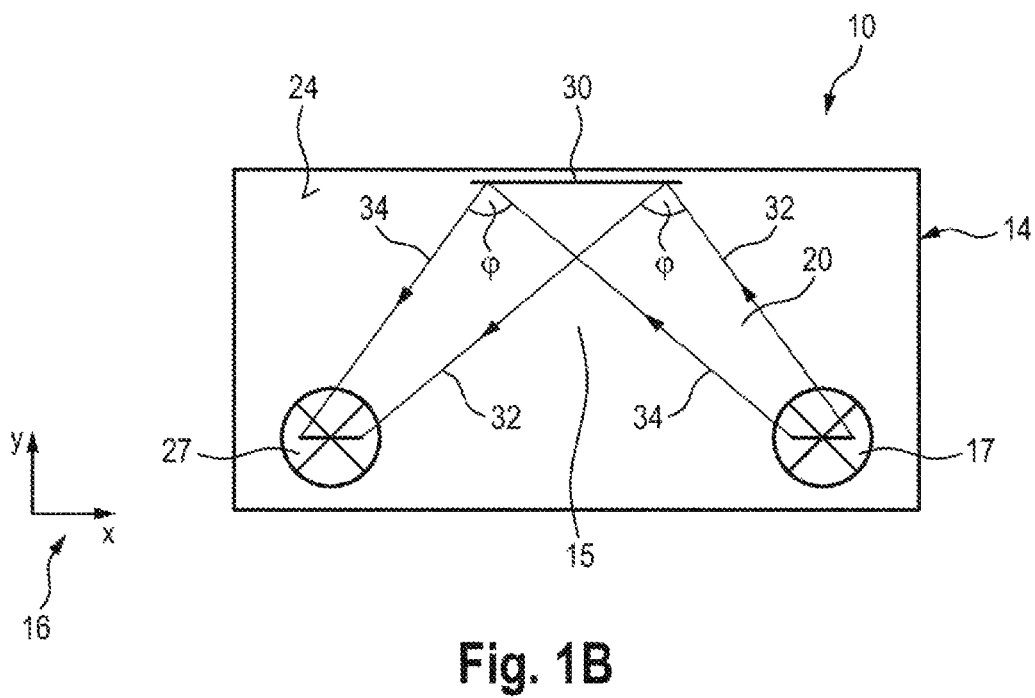

FIGS. 1A and 1B schematically show views of an optical system, provided with the general reference sign 10, for transmitting a source image. In particular, the optical system 10 can be embodied as smartglasses or video glasses, as a head-mounted display (HMD) or else as a head-up display (HUD). Here, the source image is provided by a display 12, for example a micro-display. The source image can be a live image or video sequence of a camera, or an image from another data source.

The optical system 10 has a light guide arrangement 14. The light guide arrangement 14 has a single optical waveguide. The light guide arrangement 14 is transmissive to light in the visible spectrum and has a material that has a higher refractive index than air. The light guide arrangement 14 defines a light transmission channel 15 for transmitting the light emanating from the source image (display 12).

The light emanating from the imaging display 12 is directed to the input coupling arrangement 18 via an optical unit 19, in particular a collimation optical unit. Should the optical unit 19 be a collimation optical unit, the light emanating from the source image is incident on the light guide arrangement 14 as a parallel light beam.

To simplify the description of the directions in space, a coordinate system 16 is respectively plotted in FIGS. 1A and 1B. To simplify the understanding, the x-axis denotes the horizontal direction perpendicular to the viewing direction of the viewer in the following description and the y-axis denotes the vertical direction when the optical system 10 is worn on the head of the viewer. Here, the z-axis denotes the normal of the light guide arrangement pointing away from the viewer.

The optical system 10 has an optical input coupling arrangement 18, by means of which light 20 emanating from the source image is coupled into the light guide arrangement 14 such that the light can propagate in the light guide arrangement 14 byway of total-internal reflection. The input coupling arrangement 18 can have a diffractive optical arrangement, which should also be understood to mean an arrangement with volume holograms, or a reflective optical arrangement or a structure which deflects the light beams incident thereon in such a way that said light beams are able to propagate in the light guide arrangement by way of total-internal reflection. Consequently, input coupling should be understood to mean such a deflection. The input coupling arrangement 18 defines an input coupling region 17. Light 20 emanating from the source image (display 12) has a field angle spectrum in the xy-plane, which is caused by the geometry and dimensions of the source image. By way of example, the light emanating from the source image can have a rectangular field angle spectrum, for example with a 49° vertical field (y-axis) and 27° horizontal field (x-axis).

Then, the light 20 coupled into the light guide arrangement 14 via the input coupling arrangement 18 in the input coupling region 17 propagates in the light guide arrangement 14 from the input coupling arrangement 18 by way of total-internal reflection at the interfaces 22 and 24 of the light guide arrangement 14. The propagation of the light 20 in the light guide arrangement 14 by total-internal reflection requires only light beams of the light 20, which are incident on the interfaces 22, 24 at an angle of incidence that is greater than the critical angle of total-internal reflection but less than 90°. On account of tolerances from manufacturing and adjustment, a distance of approximately 5° should be maintained from the boundaries.

Furthermore, the optical system 10 has an optical output coupling arrangement 26 that defines an output coupling region, by means of which the light that has propagated in the light guide arrangement 14 is coupled out of the light guide arrangement 14 to an eye 28 such that the transmitted source image can be perceived by a viewer.

In FIG. 1A, the input coupling arrangement 18 and the output coupling arrangement 16 are shown as structures that are embedded in the light guide arrangement 14; however, they could also be located at one or both of the interfaces 22 and 24. The input coupling arrangement 18 can have a transmissive or reflective diffraction grating. As an alternative or in addition thereto, the input coupling arrangement 18 can have one or more volume holograms or one or more Fresnel mirrors. In further variants, a prism placed on the light guide arrangement 14 or a specifically designed edge region of the interface 22 or 24 is conceivable, for example with free-form prisms with a collimating effect. In general, such specifically designed edge regions can be characterized in that the interface 22 or 24 has a different orientation/surface normal in the input coupling region than the remaining region of the light guide arrangement 14. The input coupling arrangement 18 can be embedded in the light guide arrangement (transmissive or reflective input coupling arrangement) or on the light entry surface 24 (transmissive input coupling arrangement) or on the surface 22 located opposite the light entry surface (reflective input coupling arrangement). In the case of the design of the input coupling arrangement 18 with a mirror, which may optionally be segmented like a Fresnel mirror, for example, said mirror is suitably tilted with respect to the surface normal of the light guide arrangement and/or rotated about the normal. The input coupling arrangement 18 has the function of deflecting the light beams, which emanate from the source image, upon entry or immediately after entry into the light guide arrangement 14 in such a way that the light beams are then able to propagate in the light guide arrangement 14 by way of total-internal reflection at the interfaces 22, 24 of the light guide arrangement 14 (for example, air/glass or air/plastic transition). Likewise, the output coupling arrangement 26 can have a reflective or transmissive embodiment and have a diffraction grating or one or more mirrors which, in particular, act as a beam splitter such that the viewer can perceive through the output coupling region 27 not only the source image but also the real surroundings with a superposed source image through the light guide arrangement 14 (referred to as augmented reality).

FIG. 1A shows only a single representative light ray emanating from the source image in order to simplify the representation. However, it is understood that the light emanating from the source image (display 12) is a two-dimensional field of light beams.

Furthermore, the light guide arrangement 14 has an optical deflection device 30 which, as seen in the direction of propagation of the light 20 in the light guide arrangement 14, is disposed between the input coupling arrangement 18 and the output coupling arrangement 26. The deflection device 30 is embodied to deflect light beams, which emanate from the input coupling arrangement 18 with different beam or field angles and which are incident on the deflection device 30 in divergent fashion, to the output coupling arrangement 26 in focused fashion. FIG. 1B shows two marginal rays 32 and 34, which represent the envelope of the light beams (also referred to as light pipe) in the xy-plane. The light pipe has its greatest spread or width at the deflection device 30. From the deflection device 30, the spread or width of the light pipe (marginal rays 32, 34) reduces toward the output coupling arrangement 26. Consequently, the effect of the deflection device 30 is that the geometric extent of the input coupling arrangement 18 can be kept small, even in the case of a large field of view of the transmitted source image.

In particular, the deflection device 30 can be embodied in such a way that the light beams incident thereon are always deflected by the same angle φ, independently of the field angle thereof.

Moreover, the deflection device can be embodied as a pupil relay optical unit, in particular, which images a source image-side entry pupil, for example the entry pupil of the optical unit 19, onto a viewer-side exit pupil, for example the pupil of the eye of the viewer, as will still be described below.

The deflection device 30 can have a reflective or diffractive optical structure or a combination of a reflective and diffractive structure. The term "diffractive structure" comprises not only diffraction gratings but also holographic-optical elements, in particular holographic mirrors, in particular volume holograms.

The deflection device 30 can have surface gratings, mirrors or volume holograms, but could also have combinations of such structures or elements.

Figure 2:
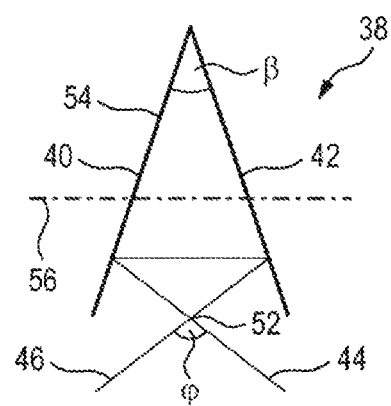
FIG. 2 shows an angled mirror for elucidating the beam deflection of a light ray on such an angled mirror.

A design of the deflection device 30 with a reflective optical structure is described below. An optical structure that is well-suited to the deflection device 30 is a structure made of a plurality of angled mirrors. FIG. 2 shows a single angled mirror 38. The angled mirror 38 has two plane mirrors 40 and 42, which are inclined to one another in roof-shaped fashion at an angle β. Independently of the angle β, the angled mirror 38 has, with respect to the beam deflection, an invariance in respect of a rotation about an axis perpendicular to the principal section, i.e., about an axis perpendicular to the plane of the drawing in FIG. 2. FIG. 2 shows an incident light ray 44, which is incident on the plane mirror 40, reflected thereby toward the plane mirror 42 and reflected by the latter to form a deflected beam 46. A deflection angle φ between the incident light beam 44 and the reflected light beam 46 is always the same size, independently of the relative rotational position of the angled mirror 38 about an axis perpendicular to the plane of the drawing, and equals φ=180°−2β.

Figure 3:
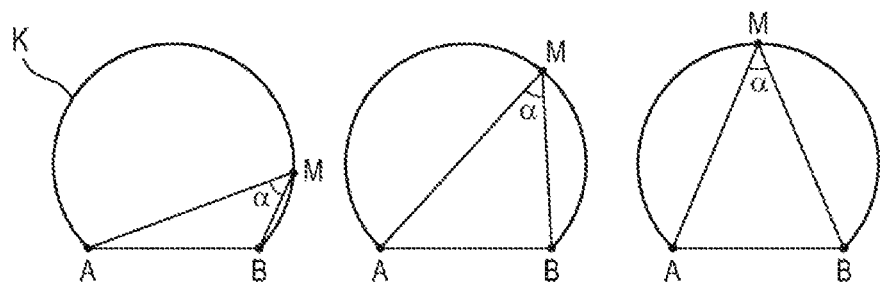
FIG. 3 shows three partial images for explaining the inscribed angle theorem.

Moreover, when designing the deflection device 30, use can be made of the inscribed angle theorem, which is elucidated in FIG. 3. According to the inscribed angle theorem, for static points A and B and a movable point M all situated on a circle K, the internal angle α at the point M of the triangle ABM is constant independently of the position of the point M, as shown for three positions of the point M in FIG. 3.

Figure 4:
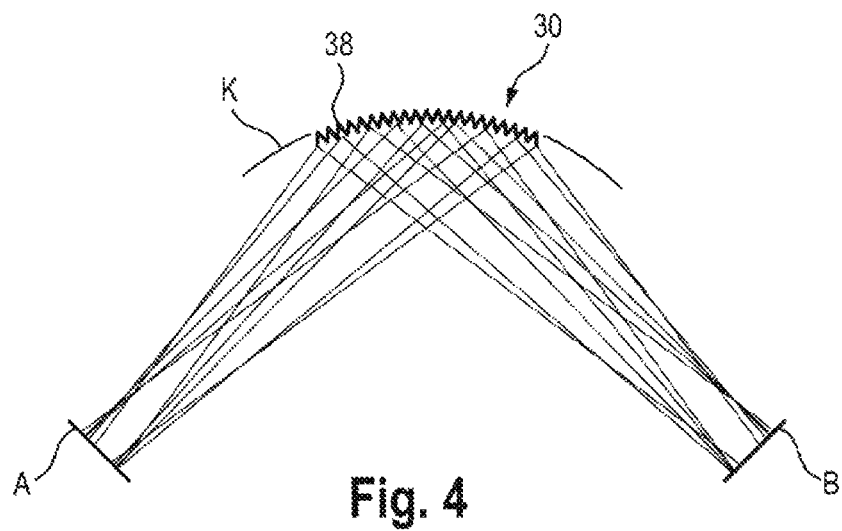
FIG. 4 shows a light beam path with a deflection at a deflection device having a plurality of angled mirrors disposed along a circular line segment.
Figure 5:
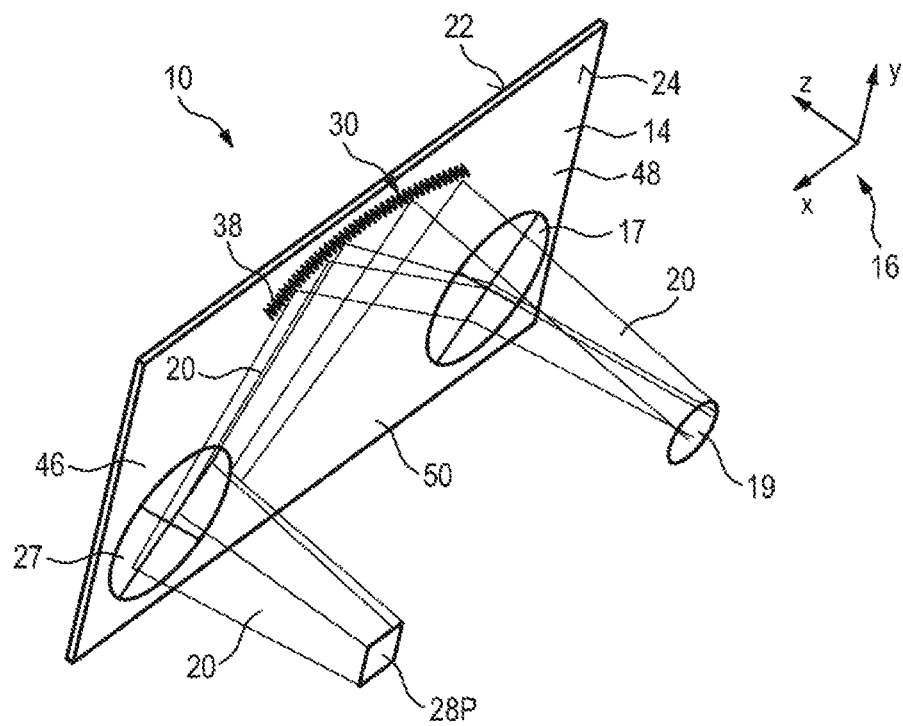
FIG. 5 shows a perspective illustration of an optical system for transmitting a source image having a deflection device as in FIG. 4.

FIG. 4 now shows a design of the deflection device 30, in which the deflection device 30 has a plurality of angled mirrors 38, which may have a miniaturized embodiment, the angled mirrors 38 being disposed along a circular line K. Thus, all light beams emanating from a region A are deflected into a region B. If the pupil of the optical unit 19 in FIG. 1A is placed in the region A while the pupil of the eye 28 is located in the region B and if the region B is moved into the clear space outside of the light guide arrangement 14 by way of the input coupling arrangement 18 and if the region A is moved into the clear space outside of the light guide arrangement 14 by way of the output coupling arrangement 26, it is possible to create a pupil relay optical unit which images the pupil of the optical unit 19 in FIG. 1A onto the pupil of the eye 28. This is illustrated in FIG. 5, which shows the optical system 10 with the light guide arrangement 14, the input coupling region 17 of the light guide arrangement 14, the output coupling region 27 of the light guide arrangement 14 and the deflection device 30 of the light guide arrangement 14, the deflection device 30 having a plurality of angled mirrors 38 which, as shown in FIG. 4, are disposed on a circular line. This renders it possible to image the pupil of the optical unit 19 onto the pupil 28P of the eye 28.

Independently of whether the deflection device 30 is constructed from angled mirrors, plane mirrors, prisms or other suitable optical elements, it can be embedded in the light guide arrangement 14. Here, the light deflection device 30 can preferably be disposed near an edge of the light guide arrangement 14, as shown in FIGS. 1B and 5. FIG. 5 shows an arrangement of the deflection device 30 on the upper edge of the light guide arrangement 14 when the optical system 10 is worn on the head of the viewer. However, as will be described in further exemplary embodiments below, the deflection device 30 could also be disposed on the nasal edge 46, the temporal edge 48 (on the side of the temple) or on the lower edge 50. When designing the deflection device 30 with angled mirrors 38 as shown in FIG. 5, the deflection device 30 operates in optimal fashion as a pupil relay optical unit if point of intersection 52 (see FIG. 2) of light beams 44, 46 (see FIG. 2), which are incident on the angled mirrors 38 and reflected by the respective same angled mirror 38, are located on the circular line segment K. However, a slight offset is acceptable and leads to the light beams belonging to the different field angles of the field angle spectrum not intersecting precisely at the pupil 28P of the eye.

Depending on the angle of incidence of the light beam of the light 20 on the angled mirror 38, there could be only one reflection or more than two reflections on the respective angled mirror 38, possibly leading to stray light. This bothersome effect can at least partly be reduced by virtue of the rotation of the angled mirrors 38 being adapted in targeted fashion to the direction of the incident light beams. Preferably, the angles of rotation of the angled mirrors 38 have different angles of rotation from one another, as is evident from FIG. 5.

Returning to FIG. 2, it is evident that the tip or the apex region 54 of the angled mirror 38 is not required for the beam deflection. Therefore, this region of the angled mirrors 38 can be cut off or removed, as indicated by a line 56 in FIG. 2. This is advantageous in that the entire deflection device 30 in the edge region of the light guide arrangement 14 can have a relatively flat embodiment.

It is understood that the angled mirrors 38 can be varied in terms of their size, twisted or displaced in terms of their relative position on an individual basis.

In order to avoid stray light as a result of the wrong number of reflections on the angled mirrors, angle-selective coatings could be provided on the angled mirrors where necessary. Optionally, the unused regions of the angled mirrors 38 and also the possibly present cut surfaces, at which the tips were cut off, can be blackened.

The size of the angled mirrors, i.e., the width of the angled mirrors 38 at their open side, should not be too small so as to avoid diffraction effects due to the angled mirrors 38, which could lead to a loss of resolution of the source image transmission into the eye of the viewer. Therefore, it is advantageous if the angled mirrors 38 have a minimum width of 0.5 mm on their open side.

As already mentioned, the deflection device 30 could also have other optical structures or elements in place of angled mirrors 38. For example, the deflection device 30 could also be realized by plane mirrors, with the pupil relay function of the deflection device 30 possibly not being able to be achieved in that case. On the other hand, this could avoid the above-described effects on account of an incoherent superposition of partial beams of light.

The deflection device 30 could also have a combination of plane mirrors and angled mirrors.

What field of view can be generated by an optical system with a deflection device is described below with reference to the further FIGS. 6A, 6B, 7A, 7B, while retaining the reference signs from FIGS. 1A and 1B. Representations in the direction cosine space (or else in k-space) are suitable to this end. A direction cosine diagram illustrates the light ray directions by representing the components of its direction vector. The direction cosine vector has a length of one. Consequently, the sum of all possible light ray directions is symbolized by a sphere (also called an Ewald sphere). If the component dircos$_x$ and dircos$_y$ of the direction cosine vector are known, the third component dircos$_z$ can be calculated by way of dircos$_z$=(dircos$_x^2$+dircos$_y^2$)$^{1/2}$. Consequently, a two-dimensional representation in the dircos$_x$–dircos$_y$ plane suffices for considering the propagation of the light in the light guide arrangement.

If the light emanating from the source image, i.e., from the imaging display 12, is incident on the light guide arrangement 14, there initially is a refraction of the light at the interface 24 (see FIG. 1A) (unless input coupling arrangement 18 is located exactly on the light entry surface 24 such that the beam deflection at the input coupling arrangement 18 is the dominant effect). As a result of the higher refractive index of the light guide arrangement 14, the light rays are refracted toward the surface normal of the interface 24 and the angle range used by the light rays is reduced accordingly. Then, the light rays are deflected further at the input coupling arrangement 18.

Figure 6A:
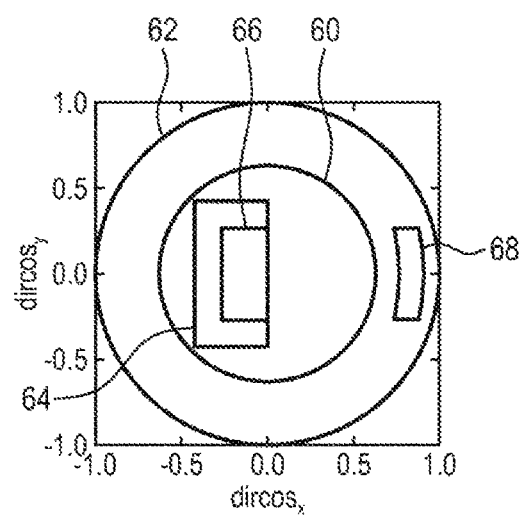
FIGS. 6A and 6B show two diagrams which elucidate, in exemplary fashion, the coupling of light into a light guide arrangement by means of an oblique mirror as an input coupling arrangement (FIG. 6A) and by means of a linear grating (FIG. 6B) in direction cosine space.
Figure 6B:
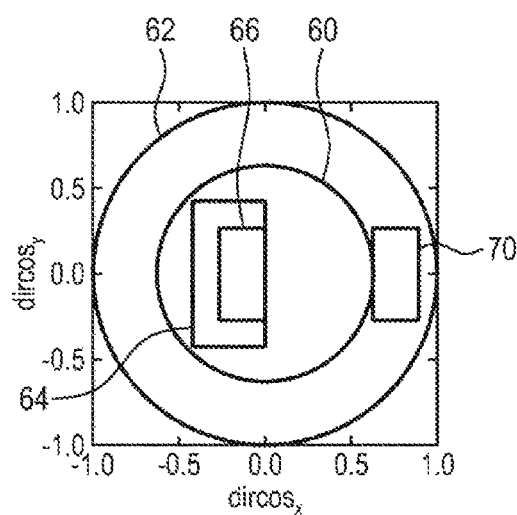

FIGS. 6A and 6B show direction cosine diagrams which the entry of the light into the light guide arrangement 14 and the deflection of the light rays at the input coupling arrangement 18 for two different designs of input coupling arrangements, specifically an input coupling arrangement formed by an oblique mirror (not illustrated) (FIG. 6A) and an input coupling arrangement having a linear diffraction grating at the interface 22 of the light guide arrangement 14.

In the diagrams as per FIGS. 6A and 6B, dircos$_y$ denotes the direction cosine of the light beams with the y-axis and dircos$_x$ denotes the direction cosine of the light beams with the x-axis.

In FIGS. 6A and 6B, an inner circle 60 in direction cosine space describes the critical angle of total-internal reflection and an outer circle 62 describes the angle of grazing incidence (90° with respect to the surface normal) on the interfaces 22 and 24 of the light guide arrangement 14. Only light rays with a beam or field angle located between the circles 60 and 62 can propagate in the light guide arrangement 14.

Furthermore, by way of a large rectangle 64, FIGS. 6A and 6B show a rectangular beam or field angle distribution (field angle spectrum) of the light 20 emanating from the source image prior to the incidence thereof in the light guide arrangement 14. A small rectangle 66 in FIGS. 6A and 6B shows, in direction cosine space, the beam or field angle distribution of the light following refraction at the entry interface (interface 24 in FIG. 1A) in the light guide arrangement 14. In exemplary fashion, this shows a source image with a field of 25° in the horizontal (x-direction) and 50° in the vertical (y-direction). As already mentioned above, the field angle spectrum reduces on account of the refraction upon entry into the light guide arrangement 14, as yielded by a comparison of the rectangles 64 and 66.

The input coupling arrangement 18 brings about a coupling of the light into the light guide arrangement 14, tantamount to a conversion of the field angle distribution, with which the light has entered into the light guide arrangement 14 (rectangle 66), between the circles 60 and 62, as shown in FIG. 6A by a frame 68 and in FIG. 6B by a frame 70. FIG. 6A describes the case where the input coupling arrangement is a mirror, which is tilted through 25° with respect to the normal of the light guide arrangement and not twisted about the normal of the light guide arrangement 14. FIG. 6B describes the case where the input coupling arrangement 18 has a linear grating, with a grating period of 1.8 lines per µm and without a rotation of the grating about the normal of the light guide arrangement 14.

So that all of the image information of the source image can be guided to the eye 28 of the viewer through the light guide arrangement 14 by way of total-internal reflection, the field angle distributions (frames 68 and 70) of the light beams in the light guide arrangement 14 must fit, in the entirety thereof, between the circles 60 and 62 for total-internal reflection and grazing incidence. The two limits should not be fully exploited on account of manufacturing-related tolerances and adjustment tolerances.

Figure 7A:
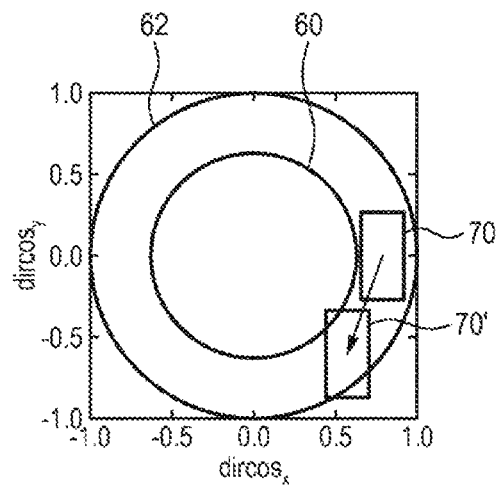
FIGS. 7A and 7B show two diagrams which show the beam deflection within the light guide arrangement by a grating twisted about a normal of the light guide arrangement as a deflection device (FIG. 7A) and by a mirror or angled mirror at an edge of the light guide arrangement (FIG. 7B) as a deflection device.

As a result of the deflection device 30, which may have further gratings or mirrors within the beam path of the light 20 in the light guide arrangement 14, for example the angled mirrors 38 as shown in FIG. 5, the field angle distribution of the light beam in the light guide arrangement 14 can be effectively deflected. The effect of such deflecting elements is elucidated in FIGS. 7A and 7B. FIG. 7A shows the case where the deflection device 30 has a grating which is twisted about the normal of the light guide arrangement 14. Such a grating leads to a displacement in the field angle distribution (frame 70) in the direction cosine space, as elucidated by a frame 70' in FIG. 7A.

Figure 7B:
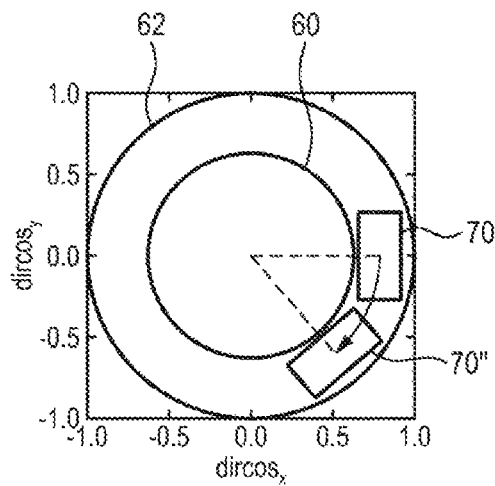

FIG. 7B shows the case of the deflection device 30 having one or more mirrors, the normal vectors of which lie in the xy-plane, i.e., parallel to the interfaces 22 and 24. In the case of such a configuration of the deflection device 30, the field angle distribution (frame 70) coupled into the light guide arrangement 14 is twisted about the origin of the direction cosine space, as elucidated by a frame 70" in FIG. 7B.

Moreover, FIG. 7A elucidates that the field angle spectrum of the light beams within the light guide arrangement 14 can be cropped by a disadvantageous deflection by the deflection device 30 since parts of the field are coupled out of the light guide arrangement 14 at the wrong location due to the critical angle of the total-internal reflection being undershot or since parts of the field propagate with grazing incidence in the light guide arrangement. Thus, overall, this means that some of the light carrying the image information is coupled out of the light guide arrangement at a wrong location and consequently does not reach the eye of the viewer, as a result of which image information is lost.

The problem of cropping the field angle distribution can be rectified by virtue of the source image being transmitted in segmented fashion, as will still be described below.

Exemplary embodiments for the optical system 10 are described below, with the spectral distribution of the light also being considered at least in part, specifically for two wavelengths. Below, two wavelengths of the light are considered in each case, said wavelengths being shifted by 30 nm from one another. Here, a wavelength at 500 nm in the blue spectral range and a wavelength of 530 nm in the green spectral range are taken into account.

Figure 8A:
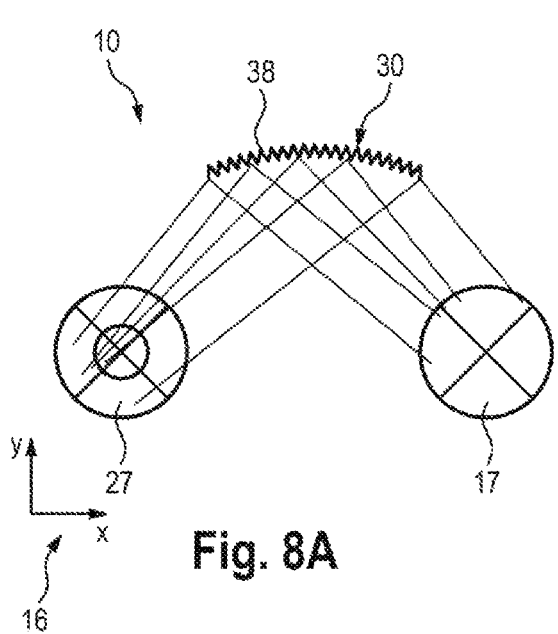
FIGS. 8A and 8B show a first exemplary embodiment of an optical system for transmitting a source image, FIG. 8A showing the geometric arrangement of parts of the system and FIG. 8B showing the associated diagram of the source image transmission in direction cosine space.

FIG. 8A shows an exemplary embodiment of an optical system 10 which corresponds to the optical system 10 in FIG. 5; the light guide arrangement is not illustrated in FIG. 8A, but the input coupling region 17 and output coupling region 27 thereof are shown. The deflection device 30 has angled mirrors 38, which are disposed along the circular line segment as described with reference to FIGS. 4 and 5.

It is assumed that the light guide arrangement has an optical waveguide made of polycarbonate with a refractive index $n_1=1.5922$ at a wavelength of $\lambda_1=530$ nm and a refractive index $n_2=1.5969$ at a wavelength of $\lambda_2=500$ nm. Furthermore, the assumption is made that the source image in air has a rectangular field angle spectrum with 48° vertical field (y-direction) and 27° horizontal field (x-direction).

Figure 8B:
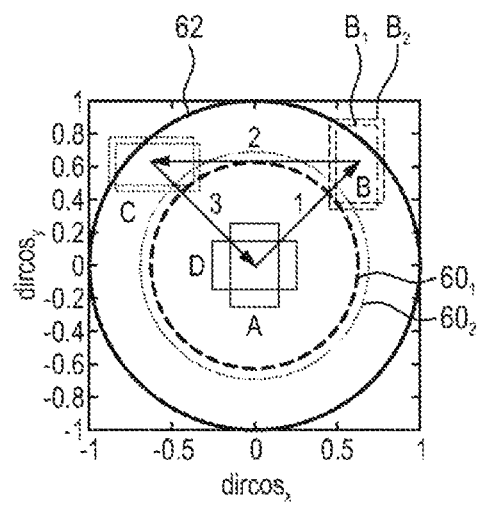

FIG. 8B shows the associated direction cosine diagram of the source field transmission for the optical system 10 in FIG. 8A.

In FIG. 8B, A shows, in the direction cosine space, the rectangular field angle spectrum of the source image, as emanates from the display 12, in air. The input coupling arrangement has a diffraction grating at 45° with respect to the surface normal of the light guide arrangement. Coupling in the light displaces the field angle spectrum into the right upper corner of the direction cosine space as per an arrow 1, with the displaced field angle spectrum being denoted by B. On account of the wavelength-dependence of the diffraction at the diffractive input coupling arrangement, two field angle distributions $B_1$ and $B_2$, which are slightly offset from one another, arise for the wavelengths displaced by 30 nm considered here. FIG. 8B shows two inner circles $60_1$ and $60_2$, the circle $60_1$ indicating the critical angle of the total-internal reflection and the circle $60_2$ indicating the critical angle of the total-internal reflection minus a tolerance of approximately 5°.

An arrow 2 in FIG. 8B describes the effect of the deflection device 30 with the angled mirrors 38, which brings about a rotation of the field angle spectrum through 90° from state B into state C by virtue of the light beams incident on the deflection device 30 being deflected through 90°. The rotation of the field angle spectrum now yields a horizontal field of 48° and a vertical field of 27° (viewed in air). At the same time, the field angle spectrum is displaced from the right upper corner of the direction cosine space into the left upper corner of the direction cosine space.

In the exemplary embodiment in FIG. 8A, the output coupling arrangement has a diffraction grating that is twisted through 90° with respect to the diffraction grating of the input coupling arrangement. As per an arrow 3, this brings about an output coupling of the light that has propagated in the light guide arrangement and transfers the field angle spectrum from the state C into the center of the direction cosine space, as denoted by D. Since the field angle spectrum in state D is no longer located in the region of total-internal reflection of the light guide arrangement, it is coupled out of the light guide arrangement into the air to the eye of the viewer. The output coupled light has a field angle spectrum with a 27° vertical field and a 48° horizontal field.

As emerges from FIG. 8B, the field angle spectrum originally coupled into the light guide arrangement is only transmitted in part since parts of the field angle spectrum are located outside of the region between the circles $60_1$ and 62 in both states D and C. Field angle regions located within the circle $60_1$ are output coupled at the wrong position of the light guide arrangement and field angle ranges located outside of the circle 62 are extinguished. As already mentioned above, this problem can be rectified by segmenting the source image into a plurality of partial fields and by transmitting individual partial fields in different light transmission channels of the light guide arrangement, as will still be described below.

Figure 9A:
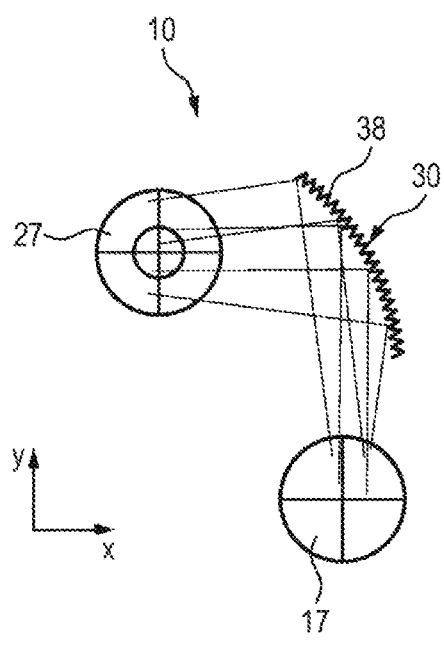
FIGS. 9A and 9B show a further exemplary embodiment of an optical system for transmitting a source image, FIG. 9A showing the geometric arrangement of parts of the system and FIG. 9B showing the associated diagram of the source image transmission in direction cosine space.

FIG. 9A shows a further exemplary embodiment of an optical system 10, the light guide arrangement not being shown but only the input coupling region 17 thereof, which has assigned an input coupling arrangement, and the output coupling region 27, which has assigned an output coupling arrangement, thereof. In this exemplary embodiment, the input coupling and output coupling regions 17, 27 are offset from one another vertically (i.e., in the y-direction) and the deflection device 30 has a tilted arrangement in relation to the deflection device 30 in FIG. 8A.

The same wavelengths of the light are considered like in FIG. 8A.

Figure 9B:
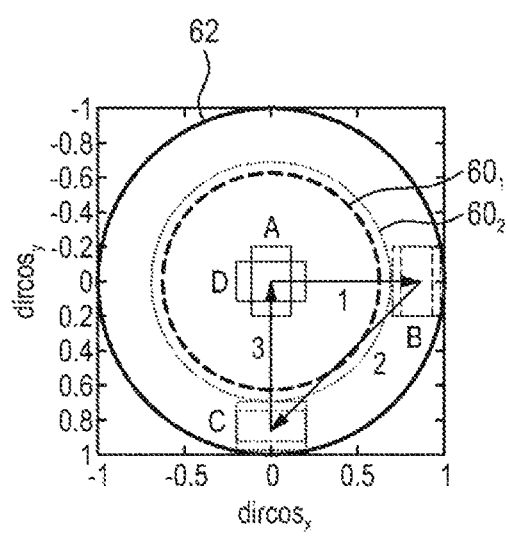

FIG. 9B shows the associated direction cosine diagram. The field angle spectrum of the source image, which is rectangular once again, was adjusted in relation to the exemplary embodiment in FIGS. 8A and 8B to a 37° vertical field and 21° horizontal field with a tolerance to the critical angle of the total-internal reflection. In FIG. 9B, a circular line $60_2$ once again denotes the tolerance to the critical angle of the total-internal reflection, which is represented by the line $60_1$.

The field angle spectrum emanating from the source image, which is denoted by A in FIG. 9B, is coupled into the light guide arrangement by the input coupling arrangement, which has an input coupling grating with vertical grating lines (y-direction). As per an arrow 1, this leads to a displacement of the field angle spectrum in the direction cosine space to the right side between lines $60_2$ and 62 (state B). As emerges from FIG. 9B, field cropping does not occur in the process.

The deflection device 30 rotates the field angle spectrum through 90° and, at the same time, displaces the latter downward in the direction cosine space as per an arrow 2 (state C). Field cropping does not occur here either.

In the exemplary embodiment, the output coupling arrangement has a diffraction grating with horizontal grating lines that is twisted through 90° with respect to the diffraction grating of the input coupling arrangement. The latter displaces the horizontally located field angle spectrum (state C) into the center of the direction cosine space (state D).

The field angle spectrum with 21° vertical field and 37° horizontal field now is no longer located within the total-internal reflection region and coupled out of the light guide arrangement 14.

The original field angle spectrum emanating from the source image is transmitted in its entirety in this exemplary embodiment.

FIG. 10A shows an exemplary embodiment of an optical system 10 for transmitting a source image, the light guide arrangement 14 of which has two transmission channels 15a and 15b, which are disposed above one another in the vertical direction (y-direction). Therefore, in the following, the light transmission channel 50a is also referred to as upper light transmission channel and the light transmission channel 50b is referred to as lower light transmission channel. In accordance with the number of light transmission channels, two input coupling regions 17a, 17b with the associated input coupling arrangements and two output coupling regions 27a, 27b with the associated output coupling arrangements are present.

For the light transmission channels 15a and 15b, the light guide arrangement 14 has a deflection device 30a and 30b, respectively, in each case, which both have a plurality of angled mirrors 38a and 38. The deflection devices 30a and 30*b* are disposed at the upper and lower edge of the light guide arrangement. The light guide arrangement 14 can have a single optical waveguide, in which both the light transmission channels are realized.

FIG. 10B shows the direction cosine diagram for the upper transmission channel 15*a* and FIG. 10C shows the direction cosine diagram for the lower light transmission channel 15*b*.

The rectangular field angle spectrum emanating from the source image is divided into two partial fields, one of which is coupled into the light guide arrangement 14 via the input coupling arrangement 18*a* and the other partial field is input coupled via the input coupling arrangement 18*b*.

In FIG. 10B and FIG. 10C, A denotes the respective portion of the field angle spectrum before coupling into the light guide arrangement 14. B denotes the respective rectangular field angle spectrum, i.e., the respective portion of the field angle spectrum, after refraction into the light guide arrangement 14, within the scope of which the light beams are refracted toward the surface normal and the extent of the field angle spectrum is reduced in the direction cosine space.

An arrow 1 shows a transfer of the respective portion of the field angle spectrum into the state C, this transfer being implemented by input coupling of the respective portion of the field angle spectrum at the input coupling arrangements 18*a* and 18*b*. Here, the input coupling arrangements 18*a* and 18*b* each have grating lines rotated through 30° in relation to the horizontal. The input coupling arrangements 18*a* and 18*b* convert the respective field angle spectrum to the outside into the region of total-internal reflection in the light guide arrangement, with field cropping occurring in both light channels in this case. The respective deflection device 30*a* or 30*b* rotates the respective portion of the field angle spectrum through 60° and displaces the latter such that the field angle spectrum transitions to state D as per arrow 2. The output coupling arrangements 26*a* and 26*b*, which each have a diffraction grating with vertical grating lines, displace the respective portion of the field angle spectrum as per arrow 3 into the state E in the center of the direction cosine space. Consequently, one part of the entire transmitted field is respectively transmitted in the two light transmission channels 15*a* and 15*b*, with these two parts emerging without an edge to form an overall field or overall field angle spectrum after being decoupled from the light guide arrangement. This overall field is formed by the overall area of the two rectangles at E.

In the exemplary embodiment as per FIGS. 10A to 10C, the assumption is made that the two partial fields of the source image are sharply adjacent to one another when they are coupled out of the light guide arrangement 14. This means that the output coupling regions of the light guide arrangement 14 as per the output coupling arrangements 18*a* and 18*b* are sharply adjacent to one another. So that the entire visual field can be perceived without loss of brightness or information even in the case of a lateral displacement of the eye 28 of the viewer for example, an overlap of the image information in the individual light transmission channels 15*a* and 15*b* is advantageous.

To this end, FIGS. 11A and 11B show two direction cosine diagrams of an exemplary embodiment that has been slightly modified in relation to the exemplary embodiment of FIGS. 10A to 10C. In this exemplary embodiment, an overlap region of, e.g., 10° is realized between the transmitted portions of the field angle spectrum. This can be realized by a different grating period of the gratings (input coupling grating and/or coupling grating) for the upper light transmission channel 15*a* and the lower light transmission channel 15*b*. The overlap region of the two partial fields in the state E decoupled from the light guide arrangement 14 is denoted by $E_1$ and $E_2$ in FIGS. 11A and 11B, respectively.

FIGS. 12A and 12B show a further exemplary embodiment of an optical system 10 for transmitting a source image, which is once again provided by a display 12. The light emanating from the source image is coupled into a light guide arrangement 14 by way of an optical unit 19, for example a collimation optical unit. The light guide arrangement 14 has a deflection device 30, which is embodied as a 2-dimensional retroreflector and which is located at a lateral edge 48 of the light guide arrangement 14. Here, the lateral edge 48 can be the nasal edge of the light guide arrangement 14. The deflection device 30 once again causes focusing of the light beams incident thereon in divergent fashion, here with two marginal rays 32 and 34 of the light propagating in the light guide arrangement 14 being shown, said marginal rays representing the envelope or the light pipe of the beam path in the light guide arrangement 14.

In this exemplary embodiment, the input coupling is implemented in the temporal edge region of the light guide arrangement 14. The field angle spectrum emanating from the source image is input coupled in the input coupling region of the input coupling arrangement 18, which may have a diffraction grating with horizontal grating lines, in such a way that a central ray 78 of the field angle spectrum extends horizontally in the direction of the deflection device 30. The deflection device 30 casts the angle spectrum in the xy-plane back on itself, as indicated by a double-headed arrow 80. From the deflection device 30, the light 20 with the entire field angle spectrum is directed to the output coupling arrangement 26, which cancels the effect of the input coupling arrangement 18 so that light with the field angle spectrum leaves the light guide arrangement 14 in the direction of the eye of the viewer, as elucidated by arrows 82.

Within the scope of input coupling, different relative pupil positions can be chosen within or outside of the light guide arrangement 14. FIG. 12A shows a variant in which the pupil of the input coupling arrangement 18 is located in the light guide arrangement 14, as elucidated here by a point of intersection 84 of the two lines of the input coupling ellipse 86. This pupil would be imaged in itself again by way of the retroreflector of the deflection device 30 at the nasal edge 48 of the light guide arrangement 14. However, the light beam returning from the retroreflector is steered out of the light guide arrangement 14 by the output coupling arrangement 26. The image of the input coupling pupil then forms the eyebox.

In this exemplary embodiment, the distance between the light guide arrangement 14 and eyebox can easily be set by varying the relative lateral position (x-direction) of the input coupling arrangement 18 or by the distance between the input coupling pupil (point of intersection 84) and the output coupling arrangement 26.

Figure 13:
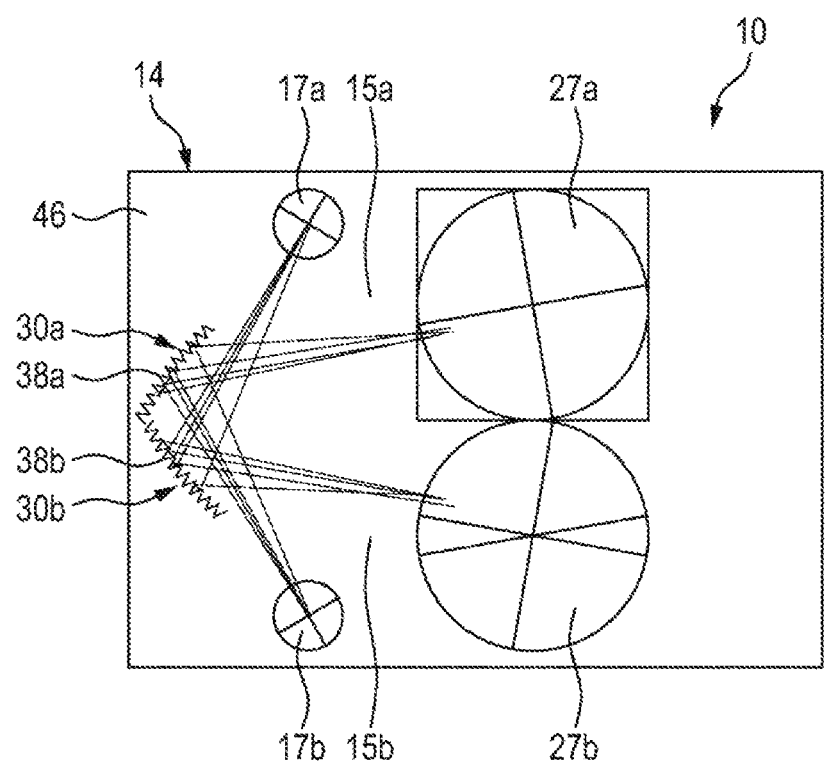
FIG. 13 shows a further exemplary embodiment of an optical system for transmitting a source image, in a development of the exemplary embodiment of FIG. 10A.

FIG. 13 shows a further exemplary embodiment of an optical system 10, which is a development of the exemplary embodiment shown in FIGS. 10A to 10C. The optical system 10 for transmitting a source image as per FIG. 13A likewise has two light transmission channels 15*a* and 15*b* in the light guide arrangement 14 and a respective deflection device 30*a* or 30*b*, each with angled mirrors 38*a* or 38*b*, for each light transmission channel 15*a* and 15*b*. In accordance with the number of light transmission channels, two input coupling regions 17*a*, 17*b* with the associated input coupling arrangements and two output coupling regions 27*a*, 27*b* with the associated output coupling arrangements are present.

In contrast to the exemplary embodiment in FIG. 10A, the two deflection devices 30a and 30b are not disposed at the upper and lower edge of the light guide arrangement 14, but instead at the temporal edge 46 of the light guide arrangement 14.

The exemplary embodiment as per FIG. 13 can also be constructed with a single light transmission channel 15 and a retroreflector as a deflection device 30, similar to the exemplary embodiment in FIGS. 12A and 12B, with the retroreflector in this case being situated at the temporal edge 46 of the light guide arrangement 14. A further embodiment variant can combine a deflection device 38a and 38b at the temporal and nasal edge of the light guide arrangement 14 in order thus to span a larger field by combining the two light paths 15a and 15b.

Instead of being straight, the light guide arrangement 14 could also be curved, corresponding to a curvature as is usually present in the case of spectacle lenses.

According to further exemplary embodiments, the deflection device 30 can have one or more holographic-optical elements, in particular holographic mirrors, in particular volume holograms. By way of example, a multiplexed (i.e., multiply exposed) volume hologram can be designed in such a way that it acts like a mirror for a defined angular or spectral range. It is also possible to generate holographic mirror surfaces that are perpendicular in the light guide arrangement 14, i.e., the normal of the mirror is perpendicular to the normal of the light guide arrangement 14. The holographic mirror surfaces are almost completely transparent to the angular and spectral ranges for which they are not designed. Consequently, such elements can also be positioned in the viewing region (region through which the case is directed) of the light guide arrangement 14 without being perceived by the user. Volume holograms consequently allow deflection devices for optical systems for transmitting source images to be realized in a very flexible fashion. By way of example, the distance of the deflection device from the output coupling and input coupling elements 26 and 18 (FIGS. 1A, 1B) can be flexibly varied.

The above-described angled mirrors 38 could also be embodied as holographic mirrors.

On account of the great angle selectivity of the volume holograms, it is also possible to avoid more than two reflections occurring in one angled mirror since the hologram for the first mirror surface of the angled mirror is almost completely transparent to light rays that have already been deflected twice.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An optical system for transmitting a source image, comprising a light guide that defines a light transmission channel, the light guide comprising:
    an optical input coupling, and
    an optical output coupling,
    wherein the input coupling is configured to couple light emanating from the source image into the light guide such that the light can propagate in the light guide by way of total-internal reflection, and
    wherein the output coupling is configure to couple the light that has propagated in the light guide out of said light guide,
    an optical deflector comprising a plurality of mirrors, which as seen in a direction of propagation of the light in the light guide, disposed between the input coupling and the output coupling, the optical deflector configured to deflect light beams that emanate from the input coupling different beam angles, which are incident on the optical deflector in a divergent fashion, to the output coupling in focused fashion,
    wherein the mirrors are angled mirrors that are disposed along a circular line segment.

2. The optical system of claim 1, wherein the optical deflector is configured to deflect the light beams, which are incident thereon, such that an angle between the incident and deflected light beam is the same for all light beams.

3. The optical system of claim 1, wherein the optical deflector is a pupil relay optical unit, which images a source image-side entry pupil onto an eye-side exit pupil.

4. The optical system of claim 1, wherein the optical deflector is embedded in the light guide.

5. The optical system of claim 1, wherein the optical deflector is disposed adjacent to an edge of the light guide.

6. The optical system of claim 5, wherein the optical deflector is disposed at any one or more of an upper, a lower, a nasal and a temporal edge of the light guide when the optical system is worn on a user's head.

7. The optical system of claim 1, wherein the mirrors are angled mirrors, and wherein apex sections of the angled mirrors are cut off or that unused regions of the angled mirrors are non-reflective, or both cut off and non-reflective.

8. The optical system of claim 1, wherein the mirrors are angled mirrors that include a coating that is angle-selective in respect of reflection by the mirrors.

9. The optical system of claim 1, wherein the mirrors are angled mirrors that have a minimum width of 0.5 mm on an open side thereof.

10. The optical system of claim 1, wherein the mirrors are angled mirrors that have different orientations from one another, said different orientations being adapted to beam angles of the incident light beams.

11. The optical system of claim 1, wherein the angled mirrors are disposed or oriented such that points of intersection of light rays incident on the angled mirrors and reflected by the angled mirrors are located on a circular line segment.

12. The optical system of claim 1, wherein the light transmission channel is a first light transmission channel for transmitting a first partial field of the source image and the light guide comprises a second light transmission channel that transmits a second partial field of the source image, wherein the optical deflector comprises a first deflection part assigned to the first light transmission channel and a second deflection part assigned to the second light transmission channel.

13. The optical system of claim 1, wherein the input coupling includes at least one mirror or diffractive structure.

14. The optical system of claim 1, further comprising a display, which provides the source image, and a collimator that directs the light emanating from the source image onto the input coupling.

15. A pair of smartglasses, video glasses or a head-up display comprising the optical system of claim 1.

* * * * *